United States Patent [19]

Hefner, Jr.

[11] Patent Number: 4,753,982
[45] Date of Patent: Jun. 28, 1988

[54] VINYL ESTER AND NORBORNYL TERMINATED UNSATURATED POLYESTER (POLYESTERAMIDE) BLENDS

[75] Inventor: Robert E. Hefner, Jr., Lake Jackson, Tex.

[73] Assignee: The Dow Chemical Company, Midland, Mich.

[21] Appl. No.: 947,001

[22] Filed: Dec. 29, 1986

Related U.S. Application Data

[63] Continuation-in-part of Ser. No. 411,178, Aug. 29, 1982, abandoned.

[51] Int. Cl.$^4$ .............. C08G 63/52; C08L 63/10; C08L 67/06
[52] U.S. Cl. ..................... 525/31; 525/438; 525/445; 428/480
[58] Field of Search .............. 525/31, 438, 445; 428/480

[56] References Cited

U.S. PATENT DOCUMENTS

| | | | |
|---|---|---|---|
| 3,793,398 | 2/1974 | Hokamura | 525/31 |
| 4,145,503 | 3/1979 | Emmons et al. | 525/445 |
| 4,261,872 | 4/1981 | Emmons et al. | 525/259 |
| 4,310,647 | 1/1982 | Zacharias | 525/530 |
| 4,363,907 | 12/1982 | Hefner, Jr. et al. | 525/438 |

Primary Examiner—John C. Bleutge
Assistant Examiner—Robert E. L. Sellers, II
Attorney, Agent, or Firm—B. G. Colley

[57] ABSTRACT

A mixture of a vinyl ester and a norbornyl terminated unsaturated polyester or polyesteramide optionally containing one or more copolymerizable ethylenically unsaturated monomers cures to provide mechanical strength, steam resistance, corrosion resistance and heat resistance in excess of that provided by one or both cured separate components of the aforesaid mixture.

12 Claims, No Drawings

VINYL ESTER AND NORBORNYL TERMINATED UNSATURATED POLYESTER (POLYESTERAMIDE) BLENDS

CROSS REFERENCE TO RELATED APPLICATION

This application is a continuation-in-part of application Ser. No. 411,178 filed Aug. 25, 1982, now abandoned.

BACKGROUND OF THE INVENTION

Vinyl esters are a well known class of curable materials prepared by reaction of monounsaturated monocarboxylic acids and polyepoxides. Typically said vinyl esters are diluted with one or more copolymerizable ethylenically unsaturated monomers to provide the more easily processed vinyl ester resins.

Norbornyl terminated unsaturated polyesters and polyesteramides are also well known as curable materials. Typically said norbornyl terminated unsaturated polyesters and polyesteramides are prepared by reaction of dicyclopentadiene, maleic anhydride, water, one or more polyols and, in the case of the polyesteramide, one or more polyamines. One or more copolymerizable ethylenically unsaturated monomers are typically blended with the aforesaid polyesters and polyesteramides.

Although both vinyl esters and norbornyl terminated unsaturated polyesters and polyesteramides provide many useful properties when used to prepare a variety of cured articles, there is substantial room for improvement in many of the properties provided by said resins. Notably, the mechanical properties, corrosion resistance, heat resistance, steam resistance and the like of one or both of the aforesaid resins are frequently deficient and would benefit from improvement. To this end, the present invention provides mixtures of vinyl esters and norbornyl terminated unsaturated polyesters or polyesteramides which provide improvements in one or more of the aforesaid properties.

It is recognized that U.S. Pat. No. 4,310,647 teaches preparation of curable mixtures of halogenated bis(dicyclopentadienyl)fumarate with vinyl esters, however, said bis(dicyclopentadienyl)ester is monomeric and thus does not contain the ester or esteramide chain required by the present invention (i.e., no polyols or polyamines are used to prepare these compositions). More importantly, halogenation of the bis(dicyclopentadienyl)esters removes the cyclopentenyl unsaturation inherent to the norbornyl terminated unsaturated polyester or polyesteramide component used in the present invention. This unsaturation is critical to provide the benefits of the present invention, especially increased heat resistance.

SUMMARY OF THE INVENTION

The invention consists of a curable mixture of a vinyl ester and a norbornyl terminated unsaturated polyester or polyesteramide optionally containing one or more copolymerizable ethylenically unsaturated monomers. The cured mixture, neat or reinforced, provides increased mechanical strength over that attainable by the norbornyl terminated unsaturated polyester or polyesteramide alone as well as enchanced corrosion resistance over that attainable by the vinyl ester alone. Heat resistance and steam resistance provided by the cured mixture are increased over that attainable by either of the cured separate components of said mixture.

The invention can be further defined as a composition consisting of
(a) 5 to 95% by weight of one or more vinyl esters,
(b) 5 to 95% by weight of a norbornyl terminated unsaturated polyester, a norbornyl terminated unsaturated polyesteramide, or mixtures thereof and
(c) 0 to 90% by weight of copolymerizable ethylenically unsaturated monomers.

DETAILED DESCRIPTION OF THE INVENTION

The norbornyl terminated unsaturated polyesters or polyesteramides which may be used herein contain an ester of esteramide chain, respectively, and have at least one terminal norbornyl radical. The ester chain is composed of the polymerizate of a polyol, an $\alpha,\beta$-unsaturated polycarboxylic acid and, optionally, a small amount of a saturated and/or aromatic polycarboxylic acid. The esteramide chain is composed of the polymerizate of polyol, a polyamine an $\alpha,\beta$-unsaturated polycarboxylic acid and optionally, a small amount of a saturated and/or aromatic polycarboxylic acid. The norbornyl radical is derived from dicyclopentadiene, dicyclopentadiene monoalcohol, polycyclopentadiene, dicyclopentadiene concentrate, mixtures thereof and the like. The norbornyl radical terminates the ester or esteramide chain through the formation of an ester linkage between the $\alpha,\beta$-unsaturated polycarboxylic acid and the norbornyl group. Specifically, the norbornyl unsaturation (or norbornyl alcohol group of dicyclopentadiene monoalcohol is used) is esterified by a carboxylic acid group of the $\alpha,\beta$-unsaturated polycarboxylic acid. Preparation of said norbornyl terminated unsaturated polyesters and polyesteramides is taught by U.S. Pat. Nos. 4,029,848; 4,117,030; 4,148,765; 4,167,542; 4,233,432; 4,246,367; 4,348,499; 4,360,634; 4,409,371; 4,410,686 and 4,471,101, which are incorporated herein by reference.

The polyols used in either norbornyl terminated unsaturated polyesters or polyesteramides are from the class of those having the formula: HO—R—OH where R is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can also be used.

The polyamines used to make norbornyl terminated unsaturated polyesteramides are from the class of those having the formula:

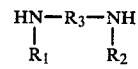

wherein $R_1$ and $R_2$ are independently selected from the group consisting of hydrogen, aliphatic, cycloaliphatic and aromatic radicals, or $R_1$ and $R_2$ taken together with the remainder of the molecule form an aliphatic ring; and $R_3$ is a divalent organic radical selected from the group consisting of alkylene, ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl)polycycloalkylene. Mixtures of two or more of such polyamines can also be used.

Typical polyamines that are useful are ethylenediamine, propylenediamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis-(aminomethyl)dicyclopentadiene and homopiperazine. Typical polyamines are aminoethylpiperazine and diethylenetriamine.

Representatives of the useful diols are: ethylene glycol, propylene glycol, diethylene glycol, dipropylene glycol, dicyclopentadiene dimethanol, bis(hydroxymethyl)norbornane, methyl cyclohexanedimethanol, bis(hydroxypropyl)bisphenol A and other hydroxyalkylated bisphenols. Typical polyols are pentaerythritol and glycerine propoxylates.

The $\alpha,\beta$-unsaturated polycarboxylic acid is preferably maleic acid, fumaric acid, the anhydride of maleic acid or mixtures of these compounds. Such acids are readily available, have good reactivity with the diol and/or the diamine, and result in products of good properties. Other less preferred polycarboxylic acids include itaconic acid, citraconic acid, and the like.

Part of the $\alpha,\beta$-unsaturated polycarboxylic acid may be replaced with a saturated or aromatic polycarboxylic acid to vary the crosslinking potential and physical properties of the norbornyl terminated polyester or polyesteramide. Such acids include the aliphatic acids such as adipic acid and the aromatic acids such as isophthalic acid. Replacement of part of the $\alpha,\beta$-unsaturated acid with such acids is commonplace in the polyester art. Suitable selection of the acid and the amount necessary to achieve a desired purpose will be known to the skilled worker and can be optimized with simple preliminary experiments.

The total amount of acid varies as a function of the total polyol and/or polyamine and norbornyl ingredients used.

The group used to terminate the unsaturated polyester or polyesteramide is a norbornyl radical. Dicyclopentadiene (DCPD) is a most preferred norbornyl functional material to be employed in terminating one or both ends of the chains. Polycyclopentadiene (i.e., DCPD oligomers) or dicyclopentadiene monoalcohol are also preferred species.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene and the like.

Either the $C_{10}$ concentrate or the relatively pure DCPD may be employed in preparing the norbornyl terminated polyesters or polyesteramide.

The norbornyl terminated unsaturated polyesters or polyesteramides can be prepared by a variety of techniques. In a preferred method, molten $\alpha,\beta$-unsaturated carboxylic acid anhydride is partially hydrolyzed with less than the stoichiometric equivalent of water and reacted with the norbornyl derivative to form an ester of that derivative and containing unesterified acid and anhydride. This reaction may conveniently be performed in stages whereby a reactant is added stepwise to control reaction exotherms. The product mixture is then reacted with the diol and/or diamine to result in the desired norbornyl terminated unsaturated polyester or polyesteramide.

In a typical procedure, molten maleic anhydride and a fraction of the stoichiometric equivalent of water is maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before addition of the next increment until the desired amount of DCPD has been added. The number of fractional equivalents can be increased and the size of each fractional equivalent correspondingly decreased to any desired number of fractional equivalents, including continuous addition. The relative size of the fractional equivalents can vary.

The amount of maleic (or other) anhydride employed in this first esterification step may be equal to the equivalent of DCPD in which even the product is essentially all ester. Alternatively, the amount of anhydride may be the equivalent needed to make the ester plus that excess that is to be used in the subsequent esterification or esteramidation step.

To the mixture of esterified DCPD and acid and/or anhydride is added the polyol and polyamine or the polyol alone. After addition of the polyol and polyamine or the polyol alone is complete, the reaction can be driven to maximum yield by maintaining or increasing the temperature until the desired acid number has been reached. Typically, acid numbers of 15 to 35 are preferred, with acid numbers of 15 to 25 being most preferred; although acid numbers that are higher or lower may be tolerated, and, in some instances, may be desired.

In an equally preferred method, molten $\alpha,\beta$-unsaturated carboxylic acid anhydride is essentially totally hydrolyzed with a stoichiometric or greater equivalent of water and reacted with the norbornyl derivative to form an ester of that derivative and containing unesterified acid. This reaction may conveniently be performed in stages whereby a reactant is added stepwise, controlling reaction exotherms. The product mixture is then reacted with the polyol and polyamine or the polyol alone to result in the desired norbornyl terminated unsaturated polyester or polyesteramide.

In a typical procedure, molten maleic anhydride and the stoichiometric or greater equivalent of water are maintained at an elevated temperature from about 50° to 150° C. The temperature is allowed to stabilize at about 120° to 125° C. and the initial fractional equivalent of DCPD is then added and allowed to react. A second fractional equivalent of DCPD is added and allowed to react. Additional fractional equivalents of DCPD are added and each allowed to react before addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

The polyol and polyamine or the polyol alone are added to the mixture of esterified DCPD and acid as previously described.

Many other alternate methods will be recognized by the skilled worker. For example, molten maleic anhydride may be added to a mixture of DCPD and water in a reactor. The polyol and polyamine or the polyol alone are added to the mixture of esterified DCPD and acid and/or anhydride as before. Finally, although less preferred, DCPD, maleic anhydride, water and glycol may be simultaneously reacted in a fashion similar to U.S. Pat. No. 4,148,765.

Vinyl esters are the reaction product of about equivalent amounts of a monounsaturated monocarboxylic acid and a polyepoxide. One class of vinyl esters is described in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl esters based on epoxy novolac resins are described in U.S. Pat. No. 3,301,743 to Fekete et al. Fekete et al. describe vinyl esters where the molecular weight of the polyepoxide is increased by reacting a dicarboxylic acid with the polyepoxide resin as well as acrylic acid, etc. in U.S. Pat. No. 3,256,226. Other difuntional compounds containing a group which is reactive with an epoxide group, such as an amine, mercaptan and the like, may be utilized in place of the dicarboxylic acid. Other types of vinyl esters are described by U.S. Pat. Nos. 3,564,074 and 3,548,030. All of the aforesaid U.S. Patents are incorporated herein by reference. All of the above-described resins, which contain the characteristic linkages

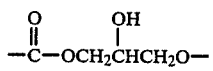

and terminal polymerizable vinylidene groups are classified as vinyl esters and are incorporated by reference.

Briefly, any of the known polyepoxides may be employed in the preparation of the vinyl esters of this invention. Useful polyepoxides are glycidyl polyethers of both polyhydric alcohols and polyhydric phenols, such as the diglycidyl ether of bisphenol A; epoxy novolacs; epoxidized fatty acids or drying oil acids; epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. The polyepoxides may be nuclearly substituted with halogen, preferably bromine. These polyepoxides are usually made by reacting at least about two moles of any epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per molecule, i.e., a 1,2-epoxy equivalency greater than one.

The mixture of a norbornyl terminated unsaturated polyester or polyesteramide with a vinyl ester typically contains one or more reactive diluents: a copolymerizable ethylenically unsaturated monomer, to alter the viscosity of the mixture, to vary the properties of the cured coating, or for other known reaons. Most any vinyl monomer may be employed which is copolymerizable with the $\alpha,\beta$-unsaturated groups of the aforesaid polyester (polyesteramide) and vinyl ester. Such monomers include both monovinyl and polyvinyl monomers. Typical monomers include the alkenyl aromatic monomers such as styrene, vinyltoluene, t-butyl styrene and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers are especially useful for ultra-violet light curable systems such as 2-acetoxyalkyl acrylates; pentaerythritol di-, tri- or tetra-acrylate and the like. Thus, the monomer(s) may be mixed with vinyl ester and then added to the norbornyl terminated unsaturated polyester or polyesteramide. Alternatively, the monomer(s) may be mixed with the norbornyl terminated unsaturated polyester or polyesteramide then added to the vinyl ester. Furthermore, one or more monomers may be added to the vinyl ester and one or more monomers may be added to the norbornyl terminated unsaturated polyester or polyesteramide followed by mixing of the two separate mixtures. The vinyl ester also may be mixed first with the norbornyl terminated unsaturated polyester or polyesteramide and the monomer(s) added to the resulting mixture.

The vinyl ester and norbornyl terminated unsaturated polyester or polyesteramide mixture and the vinyl ester, norbornyl terminated unsaturated polyester or polyesteramide and copolymerizable ethylenically unsaturated monomer mixture are curable by known catalyst systems. Preferred catalysts are the free radical forming catalysts such as peroxides, hydroperoxides, azo and diazo compounds. Peroxides, such as methyl ethyl ketone peroxide can be used with or without known accelerators such as cobalt naphthenate or cobalt octoate, that function with such peroxides. Acyl peroxides, such as benzoyl peroxide can be used with or without accelerators such as tertiary amines, including dimethylaniline and N,N-dimethyl-p-toluidine. The concentrations of catalyst and accelerator are adjusted within known limits of from about 0.1 to 5.0 weight percent depending on the rate of cure desired, the magnitude of the generated exotherm and for other known purposes. Suitable gelation retarding agents, such as p-benzoquinone, can be employed in the curing system.

As is common in the unsaturated polyester art, the norbornyl terminated unsaturated polyester or polyesteramide and vinyl ester blend optionally containing one or more copolymerizable ethylenically unsaturated monomers may be formulated with various additives. Thus, fillers, thixotropic agents, colorants, reinforcing fibers, pigments, fire retardants or suppressants, shrinkage control agents and other additives may be added to serve their intended function.

The norbornyl terminated unsaturated polyester or polyesteramide and vinyl ester blend optionally containing one or more copolymerizable ethylenically unsaturated monomers have properties that make them well adapted for, encapsulation, molding, coating, casting, lamination, potting, pultrusion, filament winding and other known fabrication procedures. A preferred use is in glass fiber laminates. The compositions prepared from the blends form articles that are especially useful in high temperature environments, corrosive environments or in steam.

DESCRIPTION OF SPECIFIC EMBODIMENTS

The following vinyl ester resins are utilized:

Resin A

Bisphenol A is catalytically reacted with a glycidyl polyether of bisphenol A having an EEW of 186–192 (polyether A) at 150° C. under a nitrogen atmosphere for 1 hour to form a polyepoxide having an EEW of 535. After cooling to 110° C., additional diglycidyl ether of bisphenol A (EEW=186-192) is added with methacrylic acid and hydroquinone and reacted to a carboxylic acid content of about 2–2.5 percent. Then maleic anhydride is added to and reacted with the vinyl ester resin. The final resin, diluted with styrene, has a pH of 7.7 and contains approximately.

| Contents | % |
|---|---|
| bisphenol A | 7.7 |
| diglycidyl ether of bisphenol A (EEW = 186–192) | 36.7 |
| methacrylic acid | 9.15 |
| maleic anhydride | 1.45 |
| styrene | 45 |

RESIN B

About 1 equivalent of methacrylic acid is reacted with 0.75 equivalent of an epoxy novolac having an epoxide equivalent weight (EEW) of 175–182 and 0.25 equivalent of a glycidyl polyether of bisphenol A having an EEW of 186–192. The above reactants are heated to 115° C. with catalyst and hydroquinone present until the carboxylic acid content reaches about 1 percent. The reactants are cooled and then styrene (containing 50 ppm of t-butyl catechol) is added. The final resin diluted with styrene has a pH of 7.7 and contains approximately:

| Contents | % |
|---|---|
| styrene | 36 |
| methacrylic acid | 20.6 |
| epoxy novolac (EEW = 175–182) | 32.1 |
| diglycidyl ether of bisphenol A (EEW = 186–192) | 11.3 |

The inventive concept is illustrated in the following embodiments of the invention.

EXAMPLE 1

(Part A)

Maleic anhydride (7.0 moles, 686.42 grams) is added to a reactor and heated to 100° C. under a nitrogen atmosphere. Water (7.10 moles, 127.94 grams) is added. The reaction is cooled to 121° C. 98 Percent dicyclopentadiene (2.10 moles, 277.64 grams) is added 15 minutes after the water is added. The reactor is cooled to 120° C. and a second aliquot of 98 percent dicyclopentadiene (2.10 moles, 277.64 grams) is added. A final aliquot of 98 percent dicyclopentadiene (2.10 moles, 277.64 grams) is added. Later, propylene glycol (3.78 moles, 287.66 grams) and piperazine (0.420 mole, 36.18 grams) are added to the reactor and the steam condenser is started, nitrogen sparging is increased and the temperature controller is set at 160° C. Fifteen minutes separate each addition of dicyclopentadiene. After 2 hours at 160° C., the temperature controller is set at 205° C. After 14 hours, 100 milliliters of a water layer and 26 milliliters of organic material are collected. The reactor is cooled to 168° C. and 100 ppm of hydroquinone are added. The norbornyl terminated unsaturated polyesteramide alkyd is recovered as a clear, light yellow colored solid with a final acid number of 18.8.

(Part B)

A portion of the norbornyl terminated unsaturated polyesteramide alkyd and Resin A which has a styrene component and styrene are formulated as follows to provide the indicated weight percent of each component:

| Norbornyl Terminated Polyesteramide Alkyd (grams/wt %) | Resin A (grams[a]/wt %[b]) | Styrene (grams/wt %[c]) |
|---|---|---|
| 164.5/47.0 | 50.9/8.0 | 134.6/45.0 |
| 136.5/39.0 | 101.8/16.0 | 111.7/45.0 |
| 108.5/31.0 | 152.7/24.0 | 88.8/45.0 |
| Comparative Standards | | |
| 192.5/55.0 | none | 157.5/45.0 |
| none | 192.5/55.0 | 157.5/45.0 |

[a]Total Resin A, less styrene.
[b]Active Resin A in formulation
[c]Total Styrene in formulation (Part C)

Portions of the norbornyl terminated unsaturated polyesteramide alkyd, Resin B, which has a styrene component, and styrene are formulated as follows to provide the indicated weight percent of each component:

| Norbornyl Terminated Polyesteramide Alkyd (grams/wt %) | Resin B (grams[a]/wt %[b]) | Styrene (grams/wt %[c]) |
|---|---|---|
| 189.0/54.0 | 54.7/10.0 | 106.3/36.0 |
| 154.0/44.0 | 109.4/20.0 | 86.6/36.0 |
| 119.0/34.0 | 164.1/30.0 | 66.9/36.0 |
| 35.0/10.0 | 295.3/54.0 | 19.7/36.0 |
| none | 350.0/64.0 | none/36.0 |
| Comparative Standards | | |
| 224.0/64.0 | none | 126.0/36.0 |
| none | 224.0/64.0 | 126.0/36.0 |

[a]Total Resin B, less styrene.
[b]Active Resin B in formulation
[c]Total Styrene in formulation Part D SPI gel and cure times, plus maximum exotherm (84° C.) and the Brookfield viscosity (25° C.) were measured for each formulation. Clear, unfilled casting for use in mechanical property evaluations were prepared. A cure system of 1.0 percent benzoyl peroxide and 0.01 percent N,N-dimethylaniline was used at room temperature. The castings were post-cured 2.0 hours at 93° C. Mechanical properties were determined using an Instron machine and standard test methods (ASTM D-638 and D-790). Heat distortion temperatures (264 psi, 1820 kPa) were determined using an Aminco machine and standard test methods (ASTM D-648). A series of 8 tensile test pieces, 6 flexural test pieces, and 2 heat distortion temperature test pieces were prepared from each cured casting. All Barcol hardness values are on the 934-1 scale. The results are summarized in Table I and Table II.

TABLE I

| Sample No. | Resin Composition (wt %) | | | Brookfield Viscosity (cp or $10^3$ Pa · s) | SPI Gel Test | | |
|---|---|---|---|---|---|---|---|
| | Norbornyl Terminated Polyesteramide alkyd | Resin A | Styrene | | Gel Time (min) | Cure Time (min) | Max. Exotherm (°C.) |
| 1* | none | 55.0 | 45.0 | 552 | 8.3 | 10.7 | 192 |
| 2 | 31.0 | 24.0 | 45.0 | 580 | 6.0 | 8.0 | 212 |
| 3 | 39.0 | 16.0 | 45.0 | 485 | 5.6 | 7.5 | 207 |
| 4 | 47.0 | 8.0 | 45.0 | 377 | 4.0 | 6.1 | 222 |
| 5* | 55.0 | none | 45.0 | 304 | 2.7 | 4.4 | 210 |

| Sample No. | Average Barcol Hardness | Heat Distortion Temperature (°C.) | Tensile Strength $10^3$ psi ($10^3$ kPa) | Elongation (%) | Flexural Strength $10^3$ psi ($10^3$ kpa) | Flexural Modulus $10^5$ psi ($10^5$ kpa) |
|---|---|---|---|---|---|---|
| 1* | 29 | 92 | 10.6 (73.1) | 3.4 | 21.3 (146.9) | 5.5 (38) |
| 2 | 39 | 103 | 8.3 (57.2) | 2.1 | 20.8 (143.4) | 5.9 (41) |
| 3 | 41 | 105 | 6.7 (46.2) | 1.7 | 20.3 (140.0) | 6.1 (42) |
| 4 | 41 | 103 | 5.4 (37.2) | 1.3 | 17.8 (122.7) | 5.7 (39) |
| 5* | 42 | 111 | 4.2 (29.0) | 1.1 | 15.1 (104.1) | 6.0 (41) |

*Not an embodiment of the invention.

TABLE II

| Sample No. | Resin Composition (wt %) | | | Brookfield Viscosity (cp or $10^3$ Pa · s) | SPI Gel Test | | |
|---|---|---|---|---|---|---|---|
| | Norbornyl Terminated Polyesteramide Alkyd | Resin B | Styrene | | Gel Time (min) | Cure Time (min) | Max. Exotherm (°C.) |
| 1* | none | 64.0 | 36.0 | 260 | 8.0 | 9.5 | 209 |
| 2 | 10.0 | 54.0 | 36.0 | 242 | 7.6 | 6.0 | 214 |
| 3 | 34.0 | 30.0 | 36.0 | 478 | 4.9 | 6.3 | 216 |
| 4 | 44.0 | 20.0 | 36.0 | 586 | 4.5 | 5.7 | 204 |
| 5 | 54.0 | 10.0 | 36.0 | 607 | 3.3 | 4.7 | 213 |
| 6* | 64.0 | none | 36.0 | 735 | 2.5 | 4.2 | 219 |

| Sample No. | Average Barcol Hardness | Heat Distortion Temperature (°C.) | Tensile Strength $10^3$ psi ($10^3$ kPa) | Elongation (%) | Flexural Strength $10^3$ psi ($10^3$ kpa) | Flexural Modulus $10^5$ psi ($10^5$ kpa) |
|---|---|---|---|---|---|---|
| 1* | 39 | 101 | 9.0 (62) | 2.8 | 19.1 (132) | 5.5 (44) |
| 2 | 45 | 105 | 9.3 (64) | 2.2 | 19.1 (132) | 5.7 (39) |
| 3 | 41 | 106 | 8.3 (57) | 2.2 | 19.1 (132) | 5.5 (38) |
| 4 | 42 | 103 | 6.3 (43) | 1.5 | 17.4 (101) | 5.4 (37) |
| 5 | 45 | 105 | 5.2 (36) | 1.3 | 13.9 (95) | 5.4 (37) |
| 6* | 44 | 110 | 4.5 (31) | 1.0 | 13.2 (91) | 5.7 (39) |

*Not an embodiment of the invention

EXAMPLE 2

(Part A)

Maleic anhydride (7.0 moles, 686.42 grams) was added to a reactor and heated to 120° C. under a nitrogen atmosphere. Water (7.1 moles, 127.94 grams) was added. The reactor was cooled to 120° C. Dicyclopentadiene concentrate (278.7 grams) was added 15 minutes after the water was added. (The dicyclopentadiene concentrate contained 0.31 percent lights, 13.64 percent cyclopentadiene codimers and diolefin dimers, and 86.05 percent dicyclopentadiene.) The reactor was cooled to 120° C. A second aliquot of dicyclopentadiene concentrate (278.70 grams) was added. A final aliquot of dicyclopentadiene concentrate was added. Fifteen minutes separate each addition of dicyclopentadiene. Later, propylene glycol (3.78 moles, 287.66 grams) and piperazine (0.420 mole, 36.18 grams) were added to the reactor and the steam condenser was started, nitrogen sparging was increased and the temperature controller was set at 160° C. After 2 hours at 160° C., the temperature controller was set at 205° C. After 8.5 hours, 156 milliliters of water layer and 62.5 milliliters of organic material were collected. The reactor was cooled to 168° C. and 100 ppm of hydroquinone were added. The norbornyl terminated unsaturated polyesteramide alkyd was recovered as a clear, light yellow colored solid with a final acid number of 28.4.

A portion of the norbornyl terminated unsaturated polyesteramide alkyd was used to prepare a 30.0 percent styrene-70.0 percent alkyd solution. Then 250 grams of this solution and 250 grams of Resin B, with styrene, were mixed to provide a solution. This norbornyl terminated unsaturated polyesteramide/Resin B/styrene formulation was used to prepare 6 heat distortion temperature test bars. A cure system of 1.0 percent methyl ethyl ketone peroxide and 0.2 percent cobalt naphthenate (6.0 percent) was used at room temperature. Twenty-four hours later, the bars were post-cured for 2 hours at 93° C. Two of the bars were removed and the remaining 4 bars were again post-cured for 4 hours at 150° C. Two more bars were removed, then the remaining 2 bars were post-cured for an additional 2 hours at 230° C. All 6 bars were tested for heat distortion temperature (264 psi, 1820 kPa) using an Aminco machine and standard test methods (ASTM D-648). The results are summarized in Table III.

(Part B—Comparative Example)

A portion of the norbornyl terminated unsaturated polyesteramide alkyd of Example 2 was used to prepare a 36.0 percent styrene-64.0 percent alkyd formulation. This formulation was used to prepare six heat distortion temperature test bars which were post-cured and using the method of Example 2. The results are summarized in Table III.

(Part C—Comparative Example)

Resin B, with styrene, was used to prepare six heat distortion temperature test bars which were post-cured using the method of Example 2. The results are summarized in Table III.

TABLE III

| Example 2 | Heat Distortion Temperature (°C.) | | |
|---|---|---|---|
| | 2.0 hr/93° C. Last Post-cure | 4.0 hr/150° C. Last Post-cure | 2.0 hr/230° C. Last Post-cure |
| (Part A) | 106 | 153 | 156 |
| (Comp. Part B) | 98 | 131 | 134 |
| (Comp. Part C) | 138 | 145 | (1) |

(1) fractured during post-cure and cannot be tested for heat distortion temperature

EXAMPLE 3

(Part A)

A room temperature cure system of 0.5 percent methyl ethyl ketone peroxide, 0.5 percent t-butylperoxybenzoate (98 percent); and 0.2 percent cobalt naphthenate (6.0 percent) was substituted for the cure system of Example 2, Part A. The results are summarized in Table IV.

(Part B—Comparative Example)

A room temperature cure system of 0.5 percent methyl ethyl ketone peroxide, 0.5 percent t-butylperoxybenzoate (98 percent), and 0.2 percent cobalt naphthenate (6.0 percent) was substituted for the cure system of Example 2 (Part B). The results are summarized in Table IV.

(Part C—Comparative Example)

A room temperature cure system of 0.5 percent methyl ethyl ketone peroxide, 0.5 percent t-butylperoxybenzoate (98 percent), and 0.2 percent cobalt naphthenate (6.0 percent) was substituted for the cure system of Example 2 (Part C). The results are summarized in Table IV.

TABLE IV

| Example 3 | Heat Distortion Temperature (°C.) | | |
|---|---|---|---|
| | 2.0 hr/93° C. Last Post-cure | 4.0 hr/150° C. Last Post-cure | 2.0 hr/230° C. Last Post-cure |
| (Part A) | 133 | 154 | 159 |
| (Comp. Part B) | 101 | 153 | 153 |
| (Comp. Part C) | 145 | 148 | (1) |

(1) fractured during post-cure and cannot be tested for heat distortion temperature

EXAMPLE 4

(Part A)

Maleic anhydride (8.0 moles, 784.48 grams) was added to a reactor and heated to 70° C. under a nitrogen atmosphere. Water (4.2 moles, 75.68 grams) was added, followed 2 minutes later by dicyclopentadiene concentrate (159.15 grams). The dicyclopentadiene concentrate was the same as that used in Example 2. Additional dicyclopentadiene concentrate (159.15 grams) and water (25.23 grams) were later added to the reactor. A third aliquot of dicyclopentadiene concentrate (159.15 grams) was added. Later, a final aliquot of dicyclopentadiene concentrate (159.15 grams) was added and the temperature controller was set at 110° C. Fifteen minutes separated each addition of dicyclopentadiene. Later, propylene glycol (474.86 grams) was added to the reactor and the steam condenser was started, nitrogen sparging was increased and the temperature controller was set at 160° C. After 2 hours at 160° C., the temperature controller was set at 205° C. 188.5 Milliliters of water layer and 21.0 milliliters of organic material were collected. The reactor was cooled to 165° C. and 100 ppm of hydroquinone were added. The norbornyl terminated unsaturated polyester alkyd was recovered as a clear, light yellow solid with a final acid number of 30.3.

A portion of the norbornyl terminated unsaturated polyester alkyd was used to prepare a 30.0 percent styrene-70.0 percent alkyd solution. Two hundred fifty grams of this solution and 250 grams of Resin B (with styrene) were then mixed to provide a solution. This norbornyl terminated unsaturated polyester/Resin B/styrene solution was used to prepare six heat distortion temperature test bars. A cure system of 1.0 percent methyl ethyl ketone peroxide and 0.2 percent cobalt naphthenate (6.0 percent) was used at room temperature. Twenty-four hours later, the bars were post-cured for 2 hours at 93° C. Two of the bars were removed and the remaining 4 bars were post-cured for 4 hours at 150° C. Two bars were again removed, then the remaining 2 bars were post-cured for 2 hours at 230° C. All 6 bars were tested for heat distortion temperature (264 psi, 1820 kPa) using an Aminco machine and standard test methods (ASTM D-648). The results are summarized in Table V.

(Part B—Comparative Example)

A portion of the norbornyl terminated unsaturated polyester alkyd of Example 1 was used to prepare a 36.0 percent styrene/64.0 percent alkyd solution. This solution was used to prepare 6 heat distortion temperature test bars which were post-cured and using the method of, Example 4. The results are summarized in Table V.

(Part C—Comparative Example)

Resin B (with styrene) was used to prepare 6 heat distortion temperature test bars using the method of Example 4. The results are summarized in Table V.

TABLE V

| Example 4 | Heat Distortion Temperature (°C.) | | |
|---|---|---|---|
| | 2.0 hr/93° C. Last Post-cure | 4.0 hr/150° C. Last Post-cure | 2.0 hr/230° C. Last Post-cure |
| (Part A) | 122 | 155 | 159 |
| (Comp. Part B) | 111 | 155 | 160 |

TABLE V-continued

| | Heat Distortion Temperature (°C.) | | |
|---|---|---|---|
| Example 4 | 2.0 hr/93° C. Last Post-cure | 4.0 hr/150° C. Last Post-cure | 2.0 hr/230° C. Last Post-cure |
| (Comp. Part C) | 137 | 145 | (1) |

(1) fractured during post-cure and cannot be tested for heat distortion temperature

EXAMPLE 5

(Part A)

A room temperature cure system of 0.5 percent methyl ethyl ketone peroxide, 0.5 percent t-butylperoxybenzoate (98 percent), and 0.2 percent cobalt naphthenate (6.0 percent) was substituted for the cure system of Example 4 (Part A). The results are summarized in Table VI.

(Part B—Comparative Example)

A room temperature cure system of 0.5 percent methyl ethyl ketone peroxide, 0.5 percent t-butylperoxybenzoate (98 percent), and 0.2 percent cobalt naphthenate (16.0 percent) was substituted for the cure system of Example 4 (Part B). The results are summarized in Table VI.

(Part C—Comparative Example)

A room temperature cure system of 0.5 percent methyl ethyl ketone peroxide, 0.5 percent t-butylperoxybenzoate (98 percent), and 0.2 percent cobalt naphthenate (6.0 percent) was substituted for the cure system of Example 4 (Part C). The results are summarized in Table VI.

TABLE VI

| Example 5 | 2.0 hr/93° C. Last Post-cure | 4.0 hr/150° C. Last Post-cure | 2.0 hr/230° C. Last Post-cure |
|---|---|---|---|
| (Part A) | 132 | 165 | 166 |
| (Comp. Part B) | 114 | 161 | 160 |
| (Comp. Part C) | 145 | 148 | (1) |

(1) fractured during post-cure and cannot be tested for heat distortion temperature

EXAMPLE 6

(Part A)

A norbornyl terminated unsaturated polyesteramide alkyd was prepared using the method of Example 1.

(Part B)

A portion of the norbornyl terminated unsaturated polyesteramide alkyd, Resin B (which has a styrene component), and styrene were formulated as follows to provide the indicated weight percent of each component:

| Norbornyl Terminated Polyesteramide Alkyd (grams/wt %) | Resin B (grams[a]/st %[b]) | Styrene (grams/wt %[c]) |
|---|---|---|
| 325.0/50.0 | 101.56/10.0 | 223.44/40.0 |
| 260.0/40.0 | 203.13/20.0 | 186.87/40.0 |
| Comparative Standard | | |
| 370.5/57.0 | none | 279.5/43.0 |

[a]Total Resin B, less styrene.
[b]Active Resin B in formulation
[c]Total Styrene in formulation (Part C)

Each respective formulation was used to prepare a fiberglass laminate using the following standard hand-layup procedure.

A sheet of 0.005 inch Mylar film was attached to a smooth flat surface with masking tape. An area of sufficient size was covered with a thin coating of the laminating resin and the surface C-veil (K514-236 treatment) was laid down and smoothed out. Additional resin was applied and the first layer of 1.5 ounce chopped fiberglass mat (M113-K247 treatment) was applied. This was carefully rolled down with a serrated aluminum roller to exclude all trapped air. Resin was added, followed by a second layer of 1.5 oz chopped fiberglass mat. Rolling again removed any entrapped air. After adding additional resin, the final surface C-veil was applied and smoothed out. Straight steel rails of ⅛ inch square in cross-section were placed along all 4 sides of the laminate. A cover sheet of Mylar was rolled onto a 2 inch diameter tube long enough to bridge the rails. Additional resin was added to the laminate and the Mylar was rolled out over it. The Mylar was then stretched tightly and taped down. Any entrapped air or excess resin was squeezed out of the laminate using a wooden tongue depressor. The laminate was left until the polymerization exotherm had subsided and cooling to ambient temperature had occurred. The laminate was removed and post-cured at 93° C. (200° F.) for 2.0 hours.

A cure system of 1.0 percent methyl ethyl ketone peroxide and 0.3 percent cobalt naphthenate (6 percent) was used for all of the laminates. Both the norbornyl terminated unsaturated polyesteramide and each of the norbornyl terminated unsaturated polyesteramide/Resin B mixtures were retarded with 100 ppm of p-benzoquinone prior to lamination. This was necessary to prevent gelation during the laminate preparation.

Pairs of 4.5×3.5 inch coupons were prepared from each laminate. Each coupon was then beveled on all 4 sides. The coupons were then edge coated with a resin of the following compositions:

10 percent paraffin wax is dissolved in 90 percent styrene.

3 percent of the wax solution is added to Resin B.

1 percent benzoyl peroxide paste is dissolved in the Resin B wax solution. The solution is heated to 50° C. Room temperature curing was accomplished by addition of 0.1 percent dimethylaniline.

All edge coated coupons were postcured at 93° C. (200° F.) for 2.0 hours.

One coupon from each laminate was weighed and the thickness measured. The coupons were placed on end in a glass rock to separate each coupon. The glass rack was then placed on a suspended platform in an aluminum pressure cooker. Water was added to the level of the platform, then the cooker was sealed, heated to 120° C., and regulated at 15 psi. After 24 hours, the exposed coupons were removed, weighed and the thickness measured. Each coupon was cut into three 1.0×3.0 inch flexural test pieces. The flexural strength and modulus were determined using an Instron machine with standard test methods (ASTM D-790). The average Barcol hardness was then determined. All Barcol hardness values are on the 934-1 scale.

The unexposed coupon of each resin laminate was used to determine the flexural strength and modulus as well as the average Barcol hardness. The results are reported in Table VII.

TABLE VII

|  | Norbornyl Terminated Unsaturated Polyesteramide 50% Resin B - 10% Styrene - 40% | | Norbornyl Terminated Unsaturated Polyesteramide 40% Resin B - 20% Styrene - 40% | | Resin B - 64%* Styrene - 36% | | Norbornyl Terminated Unsaturated Polyesteramide 57% Styrene - 43% | |
| --- | --- | --- | --- | --- | --- | --- | --- | --- |
|  | Unexposed | Exposed | Unexposed | Exposed | Unexposed | Exposed | Unexposed | Exposed |
| Flexural Strength $10^3$ psi ($10^3$ kPa) [% change] | 14.698 (101.339) | 15.498 (106.855) [5.44] | 14.036 (96.775) | 13.982 (96.402) [−.39] | 10.941 (75.435) | 10.745 (74.084) [−1.79] | 11.667 (80.441) | 12.889 (88.866) [10.47] |
| Flexural Modulus $10^5$ psi ($10^5$ kPa) [% change] | 8.05 (55.5) | 7.83 (54.0) [−2.7] | 8.21 (56.6) | 7.09 (48.9) [−13.6] | 8.51 (58.7) | 7.41 (51.1) [−12.9] | 7.99 (55.1) | 6.24 (43.0) [−22.0] |
| Barcol Hardness [% change] | 45.9 | 41.7 [−9.2] | 46.7 | 41.1 [−12.0] | 52.1 | 39.1 [−25.0] | 47.1 | 43.1 [−8.5] |
| Thickness [% change] | — | [0.37] | — | [1.25] | — | [4.05] | — | [3.96] |
| Weight [% change] | — | [0.92] | — | [1.03] | — | [1.01] | — | [0.72] |

*Not an embodiment of the invention.

EXAMPLE 7

(Part A)

A norbornyl terminated unsaturated polyesteramide alkyd was prepared using the method of Example 1. The final acid number was 18.9.

(Part B)

A portion of the norbornyl terminated unsaturated polyesteramide alkyd and Resin A which has a styrene component, and styrene are formulated as follows to provide the indicated weight percent of each component:

| Norbornyl Terminated Polyesteramide Alkyd (grams/wt %) | Resin B (grams[a]/wt %[b]) | Styrene (grams/wt %[c]) |
| --- | --- | --- |
| 822.5/47.0 Comparative Standards | 254.55/8.0 | 787.51/45.0 |
| 997.5/57.0 | none | 752.5/43.0 |
| none | 962.5/55.0 | 787.5/45.0 |

[a] Total Resin B, less styrene.
[b] Active Resin B in formulation
[c] Total Styrene in formulation

(Part C)

Each respective formulation was used to prepare a fiberglass laminate using the method of Example 6. Three 4.5×3.5 inch coupons were prepared from each laminate and edge coated using the method of Example 6.

Two coupons from each laminate were weighed and the thickness measured. The coupons were placed on end in a stainless steel rack to separate each coupon. The steel rack was then placed in a stainless steel tank fitted with a chilled reflux condenser. The steel rank was filled with enough aqueous sodium hydroxide (5.0 percent) to cover all coupons and then placed into an hot oil bath regulated at 99° C. After 1 month (30 days) and after 3 months (90 days), exposed coupons were removed, weighed, and the thickness measured. Each coupon was cut into three 1.0×3.0 inch flexural test pieces. The flexural strength and modulus were determined using an Instron machine with standard test methods (ASTM D-790). The average Barcol hardness was then determined. All Barcol hardness values are on the 934-1 scale.

The unexposed coupon of each resin laminate was used to determine the flexural strength and modulus as well as the average Barcol hardness. The results are reported in Table VIII.

TABLE VII

| | Resin Composition (Wt. %) | | | | | | | | |
| --- | --- | --- | --- | --- | --- | --- | --- | --- | --- |
|  | Norbornyl Terminated Polyesteramide - 47.0% Resin A - 8.0% Styrene - 45.0% | | | Resin A - 55.0%* Styrene - 45.0% | | | Norbornyl Terminated* Polyesteramide - 57.0% Styrene - 43.0% | | |
|  | Un-exposed | Exposed 1 Month | Exposed 3 Months | Un-exposed | Exposed 1 Month | Exposed 3 Months | Un-exposed | Exposed 1 Month | Exposed 3 Months |
| Flexural Strength $10^3$ psi. ($10^3$ kPa) [% change] | 13.553 (93.445) | 12.033 (82.965) [−11.08] | 5.611 (38.688) [−58.60] | 17.822 (122.878) | 12.485 (86.081) [−29.95] | 10.620 (73.225) [−40.41] | 11.667 (80.441) | 10.407 (71.754) [−10.80] | 8.316 (57.339) [−28.72] |
| Flexural Modulus $10^5$ psi ($10^5$ kPa) [% change] | 8.72 (60.10) | 7.93 (54.7) [−9.06] | 6.13 (42.266) [−29.70] | 8.93 (61.6) | 7.37 (50.8) [−17.47] | 6.92 (47.713) [−22.51] | 7.99 (55.1) | 7.60 (52.4) [−4.88] | 4.43 (30.545) [−44.56] |
| Barcol Hardness [% change] | 44.6 | 42.4 [−4.93] | 17.4 [−61.44] | 42.3 | 33.7 [−20.33] | 30.7 [−27.42] | 47.1 | 40.7 [−13.59] | 1.6 [−96.60] |
| Thickness | — | [2.08] | [6.50] | — | [2.84] | [7.36] | — | [2.13] | [13.29] |

TABLE VII-continued

| | Resin Composition (Wt. %) | | | | | | | | |
|---|---|---|---|---|---|---|---|---|---|
| | Norbornyl Terminated Polyesteramide - 47.0% Resin A - 8.0% Styrene - 45.0% | | | Resin A - 55.0%* Styrene - 45.0% | | | Norbornyl Terminated* Polyesteramide - 57.0% Styrene - 43.0% | | |
| | Un-exposed | Exposed 1 Month | Exposed 3 Months | Un-exposed | Exposed 1 Month | Exposed 3 Months | Un-exposed | Exposed 1 Month | Exposed 3 Months |
| [% change] Weight [% change] | — | [1.98] | [9.35] | — | [3.28] | [10.04] | — | [2.73] | [12.40] |

*Not an embodiment of the invention

EXAMPLE 8

(Part A)

A commercial grade norbornyl terminated unsaturated polyester laminating resin was obtained wherein the following mole ratios of reactants were used to prepare said resin: maleic anhydride (1.0 mole), dicyclopentadiene concentrate (1.05 moles), water (1.1 moles), ethylene glycol (0.24 mole), diethylene glycol (0.24 mole). The maleic anhydride was incrementally added to the dicyclopentadiene concentrate-water mixture followed by addition of the glycols, polyesterification, then styrenation of the norbornyl terminated unsaturated polyester alkyd to 35 percent.

(Part B)

A portion of the norbornyl terminated unsaturated polyester resin and Resin A, both of which have a styrene component, and styrene are formulated as follows to provide the indicated weight percent of each component:

| Norbornyl Terminated Polyester Alkyd (grams$^a$/wt$^b$ %) | Resin A (grams$^c$/wt %$^d$) | Styrene (grams/wt %$^e$) |
|---|---|---|
| 150.0/29.8 | 150.0/25.2 | 147.3/45.0 |
| 25/0/5.3 | 275.0/49.7 | 137.0/45.0 |
| Comparative Standards | | |
| 300.0/65.0 | none | 159.55/45.0 |
| none | 165.0/55.0 | 135.0/45.0 |

$^a$Total norbornyl terminated polyester resin with styrene
$^b$Active norbornyl terminated unsaturated polyester
$^c$Total Resin A, less styrene.
$^d$Active Resin A in formulation
$^e$Total Styrene in formulation

(Part C)

Each respective formulation was used to determine physical and mechanical properties using the method of Example 1 (Part D). The results are reported in Table IX.

TABLE IX

| | Resin Composition | | | | SPI Gel Test | | |
|---|---|---|---|---|---|---|---|
| Sample Number | Norbornyl Terminated Polyester | Resin A | Styrene | Brookfield Viscosity (cp or $10^3$ Pa · S) | Gel Time (min.) | Cure Time (min.) | Maximum Exotherm (°C.) |
| 7* | none | 55.0 | 45.0 | 552 | 8.3 | 10.7 | 192 |
| 8 | 5.3 | 49.7 | 45.0 | 454 | 7.5 | 9.8 | 198 |
| 9 | 29.8 | 25.2 | 45.0 | 354 | 5.6 | 8.6 | 187 |
| 10 | 55.0 | none | 45.0 | 230 | 4.7 | 8.1 | 165 |

| Sample Number | Average Barcol Hardness | Heat Distortion Temperature (°C.) | Tensile Strength $10^3$ psi ($10^3$ kPa) | Elongation (%) | Flexural Strength $10^3$ psi ($10^3$ kPa) | Flexural Modulus $10^5$ psi ($10^5$ kPa) |
|---|---|---|---|---|---|---|
| 7* | 29 | 92.2 | 10.6 (73.1) | [3.4] | 21.3 (147) | 5.5 (38) |
| 8 | 39 | 101.1 | 10.3 (71.0) | [2.7] | 20.5 (141) | 5.8 (40) |
| 9 | 41 | 93.9 | 8.2 (56.5) | [1.9] | 18.9 (130) | 6.0 (41) |
| 10* | 41 | 80.0 | 8.5 (58.6) | [1.9] | 12.1 (83) | 6.1 (42) |

*Not an embodiment of the invention

I claim:

1. A composition consisting of:
   (a) 5 to 95% by weight of one or more vinyl ester resins,
   (b) 5 to 95% by weight of a norbornyl terminated unsaturated polyester, a norbornyl terminated unsaturated polyesteramide, or mixtures thereof and
   (c) 0 to 90% by weight of copolymerizable ethylenically unsaturated monomers.

2. The composition of claim 1 where said norbornyl terminated unsaturated polyester is a reaction product of:
   (a) a polyol or a mixture of polyols,
   (b) an unsaturated polycarboxylic acid anhydride or an unsaturated polycarboxylic acid anhydride/unsaturated polycarboxylic acid mixture and water;

or an unsaturated polycarboxylic acid containing water, (c) dicyclopentadiene, or a dicyclopentadiene concentrate.

3. The composition of claim 1 where said norbornyl terminated unsaturated polyesteramide is a reaction product of:

(a) a polyol or a mixture of polyols, (b) an unsaturated polycarboxylic acid anhydride or an unsaturated polycarboxylic acid anhydride/unsaturated polycarboxylic acid mixture and water; or an unsaturated polycarboxylic acid containing water, (c) dicyclopentadiene, or a dicyclopentadiene concentrate, (d) a polyamine or a mixture of polyamines.

4. The composition of claim 1 where said copolymerizable ethylenically unsaturated monomer is a vinyl aromatic monomer.

5. The composition of claim 1 where the copolymerizable ethylenically unsaturated monomer is styrene.

6. The composition of claim 2 where the polyol is ethylene glycol, propylene glycol, diethylene glycol, dipropylene glycol, dicyclopentadiene dimethanol, bis(hydroxymethyl)norbornane, methyl cyclohexanedimethanol, a glycerine polypropoxylate, bis(hydroxypropyl)bisphenol A or other hydroxyalkylated bisphenols or a mixture thereof.

7. The composition of claim 2 wherein said unsaturated polycarboxylic acid is maleic acid or anhydride or a mixture thereof.

8. The composition of claim 3 where the polyol is ethylene glycol, propylene glycol, diethylene glycol, dipropylene glycol, dicyclopentadiene dimethanol, bis(hydroxymethyl)norbornane, methyl cyclohexanedimethanol, a glycerine polypropoxylate, bis(hydroxypropyl)bisphenol A or other hydroxyalkylated bisphenols or a mixture thereof.

9. The composition of claim 3 wherein said unsaturated polycarboxylic acid is maleic acid or anhydride or a mixture thereof.

10. The composition of claim 3 where the polyamine is ethylenediamine, propylenediamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis(aminomethyl)dicyclopentadiene, homopiperazine, aminoethylpiperazine, diethylenetriamine, or a mixture thereof.

11. The composition of claims 1, 2, 3, 4, 5, 6, 7, 8, 9 or 10 where said composition is cured.

12. The composition of claim 11 where said composition is a fiber reinforced laminate.

* * * * *